United States Patent
Liang et al.

(10) Patent No.: US 12,504,418 B2
(45) Date of Patent: Dec. 23, 2025

(54) METHOD FOR EARLY WARNING OF ALGAL BLOOM LEVELS BASED ON ORDINAL FORESTS MODEL

(71) Applicant: XIAMEN UNIVERSITY, Xiamen (CN)

(72) Inventors: Zhongyao Liang, Xiamen (CN); Xinye Zhao, Xiamen (CN); Nengwang Chen, Xiamen (CN); Jixin Chen, Xiamen (CN); Fan Qu, Xiamen (CN); Yiqi Yu, Xiamen (CN); Shaobin Li, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 0 days.

(21) Appl. No.: 19/026,492

(22) Filed: Jan. 17, 2025

(65) Prior Publication Data
US 2025/0321211 A1   Oct. 16, 2025

(30) Foreign Application Priority Data
Apr. 10, 2024   (CN) .......................... 202410424853.1

(51) Int. Cl.
*G01N 33/18*   (2006.01)
*G06N 20/20*   (2019.01)

(52) U.S. Cl.
CPC ............. *G01N 33/18* (2013.01); *G06N 20/20* (2019.01)

(58) Field of Classification Search
None
See application file for complete search history.

(56) References Cited

U.S. PATENT DOCUMENTS

2020/0264151 A1\* 8/2020 Do Quang ............. G01N 33/18
2020/0355612 A1\* 11/2020 Thomas ............. G01N 21/6486
(Continued)

FOREIGN PATENT DOCUMENTS

CN   112884197 A   6/2021
CN   116882539 A   10/2023
(Continued)

OTHER PUBLICATIONS

Pan Li, et al., Residential Areas Recognition by Fusing Region Data and Edge Features, Geomatics and Information Science of Wuhan University, 2006, pp. 671-674, vol. 31 No. 8.

*Primary Examiner* — Lisa M Caputo
*Assistant Examiner* — Cynthia L Davis
(74) *Attorney, Agent, or Firm* — Bayramoglu Law Offices LLC

(57) ABSTRACT

A method for early warning of algal bloom levels based on an Ordinal Forests model includes the following steps: S1, preprocessing water quality data from a system for online monitoring of water quality and water ecology; S2, determining an algal bloom level according to a chlorophyll a value of the pre-processed water quality data; S3, using a resampling method to solve the problem of imbalanced algal bloom level data, and synthesizing a dataset of balanced algal bloom levels; and S4, taking the newly synthesized dataset in the S3 as an input variable, constructing a model for early warning of algal bloom levels based on the Ordinal Forests model, and performing early warning of algal bloom levels through the trained model for early warning of algal bloom levels.

6 Claims, 2 Drawing Sheets

(56) References Cited

U.S. PATENT DOCUMENTS

2020/0356851 A1  11/2020  Li et al.
2022/0404328 A1  12/2022  Reisfeld et al.

FOREIGN PATENT DOCUMENTS

CN      117194954 A      12/2023
KR    20230098937 A  *   7/2023
WO      2022134709 A1    6/2022

* cited by examiner

METHOD FOR EARLY WARNING OF ALGAL BLOOM LEVELS BASED ON ORDINAL FORESTS MODEL

CROSS REFERENCE TO THE RELATED APPLICATIONS

This application is based upon and claims priority to Chinese Patent Application No. 202410424853.1, filed on Apr. 10, 2024, the entire contents of which are incorporated herein by reference.

TECHNICAL FIELD

The present disclosure relates to the technical field of water quality monitoring and processing, and specifically relates to a method for early warning of algal bloom levels based on an Ordinal Forests model.

BACKGROUND

An online monitoring system of the prior art is capable of reflecting water quality of a reservoir in real time, and developing an algal bloom prediction model is crucial for enhancing control and early warning of algal blooms in reservoirs. Therefore, current conditions of algal blooms in a water body, and future changes in algal bloom levels can be accurately reflected through level-based prediction. Reservoir managers can take measures according to prediction results in a timely manner to ensure safety of drinking water resources and prevent occurrence of algal bloom events. Therefore, accurate prediction and early warning of algal bloom levels are of great significance to reservoir management and algal bloom prevention and control.

A machine learning model is usually adopted for algal bloom prediction, a prediction target is usually a continuous variable, and an algal bloom level as the prediction target is a categorical variable. However, unlike general categorical data, data of algal bloom levels belong to ordinal data, that is, there exists typical order relations between various categories of data. For ordinal data predicting, a conventional machine learning model has limitations in identifying the order relations between categories of data, and a classic ordinal regression model also has limitations in processing high-dimensional data. Therefore, applying an ordinal machine learning model capable of processing high-dimensional data is crucial for improving the accuracy of algal bloom level prediction.

SUMMARY

An objective of the present disclosure is to provide a method for early warning of algal bloom levels based on an Ordinal Forests model. The method is easy to use, and has significant advantages in processing ordinal data and imbalanced data, effectively improving an accuracy of algal bloom warning for drinking water sources.

In order to achieve the above objective, the present disclosure adopts a technical solution as follows:
a method for early warning of algal bloom levels based on an Ordinal Forests model, including the following steps:
S1, preprocessing water quality data from a system for online monitoring of water quality and water ecology; the preprocessing water quality data in the S1 specifically includes the following steps:

S11, performing quality control on water quality data, including deleting abnormal type data, deleting duplicate data, and resampling data;

S12, processing missing values of water quality data, using a Kalman filtering method to fill the missing values, gradually improving an accuracy of state estimation through continuous measurement value integration and state estimation, and completing filling of the missing values;

S13, selecting features of water quality data through a principal component analysis method; and S14, standardizing the water quality data, with a calculation formula as follows:

$$y_i = \frac{x_i - \bar{x}}{\sigma}$$

where $y_i$ is standardized data; $x_i$ is measured data; $\bar{x}$ is a mean of a dataset; and $\sigma$ is a standard deviation of the dataset;

S2, determining an algal bloom level according to a chlorophyll a value of the pre-processed water quality data;

S3, using a resampling method to solve the problem of imbalanced algal bloom level data, and synthesizing a dataset of balanced algal bloom levels;

S4, taking the newly synthesized dataset in the S3 as an input variable, constructing a model for early warning of algal bloom levels based on the Ordinal Forests model, and performing early warning of algal bloom levels through the trained model for early warning of algal bloom levels;

the S4 specifically includes the following steps:

S41, dividing the newly synthesized dataset in the S3 through a 5-fold cross-validation method, i.e., dividing the newly synthesized dataset into five folds, selecting a fold of the dataset as a test set, with other folds of the dataset as training sets in each round, and repeating five rounds; and S42, training the Ordinal Forests model using data of the training sets when hyperparameters are given. The Ordinal Forests model is a machine learning model used to solve the problem that response variables are ordinal data, which assumes that a continuous latent variable y* is used to replace a categorical value y, and optimizes the y* value by maximizing out-of-bag (OOB) estimation performance. In a model training stage, algal bloom level data and water quality data of a previous day are used as input variables of the model, and algal bloom level data of a current day is used as an output variable of the model to construct the model for early warning of algal bloom levels based on the Ordinal Forests model;

S43, inputting test set data into the model for early warning of algal bloom levels, evaluating performance of the trained model for early warning of algal bloom levels in accuracy and consistency, and adjusting hyperparameters of the model for early warning of algal bloom levels; and S44, applying the trained model for early warning of algal bloom levels to a water quality monitoring site, taking same steps to preprocess water quality data and determine algal bloom levels every day, and inputting the algal bloom level data and water quality data of the previous day as input variables into the model for early warning of algal bloom levels, to obtain a local daily algal bloom level forecast.

Preferably, the water quality data in the S1 includes concentration data, pH data, water temperature data, conductivity data, turbidity data, dissolved inorganic nitrogen data and dissolved inorganic phosphorus data of chlorophyll a.

Preferably, the deleting abnormal type data in the S11 means deleting non-numeric data, where the non-numeric data includes characters and null values; the deleting duplicate data means deleting data with duplicate timestamps; and the resampling data means unified data resampling on a daily basis by using a median method.

Preferably, the S13 specifically includes the following steps:
  S131, centralizing and standardizing processing of raw water quality data such that each feature has a mean of 0 and a variance of 1;
  S132, calculating a covariance matrix of the standardized data, and then performing eigenvalue decomposition on the covariance matrix to obtain eigenvalues and corresponding eigenvectors; and
  S133, selecting the number of principal components to be retained according to the eigenvalues, and selecting features required for modeling.

Preferably, the determining an algal bloom level in the S2 specifically includes the following steps:
  S21, observing relations between chlorophyll a concentration changes and various physical indicators according to data of field observations of a reservoir in water transparency changes, where the physical indicators include water body colors and transparency; and
  S22, with reference to relevant standards, dividing algal bloom risks into five levels according to a total chlorophyll a concentration:
  Level I: chlorophyll a value≤10 µg/L, indicating no algal bloom and good water quality;
  Level II: 10 µg/L<chlorophyll a value≤15 µg/L, early warning, indicating a potential risk of algal bloom;
  Level III: 15 µg/L<chlorophyll a value≤50 µg/L, indicating mild algal bloom, and an obvious algal bloom event in the water body;
  Level IV: 50 µg/L<chlorophyll a value≤100 µg/L, indicating severe algal bloom, and an algal bloom event posing a serious threat to the ecosystem; and
  Level V: chlorophyll a value>100 µg/L, indicating an algal bloom disaster easily causing extremely serious ecological, social and economic impacts.

Preferably, the S3 specifically includes the following steps:
  S31, counting a total number of categories of each algal bloom level according to the algal bloom level data obtained after determination based on the standards in the S2, and determining a data imbalance ratio before adjustment; and
  S32, applying adaptive synthetic sampling of the algal bloom level data to synthesize a new dataset, and performing a data balance calculation according to differences in the number of samples of different categories of algal bloom level data, where the data balance calculation specifically includes the following steps:
  S321, calculating a proportion p of majority class samples around each minority class sample;
  S322, for each minority class sample, calculating the number of new samples that need to be generated $\beta = p \times \alpha$, where $\alpha$ is an adjustable parameter used to control the number of new samples; and
  S323, randomly selecting n samples from k majority class samples nearest to each minority class sample, and inserting the samples between the minority class sample and the k samples nearest thereto to synthesize a balanced dataset of algal bloom levels.

Based on the above technical solution, the present disclosure has the following beneficial effects: the method for early warning of algal bloom levels based on an Ordinal Forests model of the present disclosure is easy to use, and in a data quality control stage, an influence of abnormal data on model construction and accuracy evaluation is reduced through outlier identification and missing value interpolation; the principal component analysis method is applied to extract variables highly correlated with prediction variables and remove noise features, which can enhance a generalization capability of the model. Moreover, the OrdinalForests model, as an ordinal machine learning model, outperforms conventional machine learning models in simulating and predicting algal bloom levels. The model is capable of identifying and processing ordinal data, thereby improving the accuracy of algal bloom level prediction and facilitating simpler and more automated decision-making management for drinking water management. To sum up, these novel methods not only provide a basis for algal bloom level control of drinking water sources, but also effectively improve a management effect of algal bloom forecasting and early warning, demonstrating reliability.

DETAILED DESCRIPTION OF THE EMBODIMENTS

To make the objectives, technical solutions and advantages of the present disclosure clearer, the present disclosure will be described in further detail below in conjunction with the examples. It should be understood that specific examples described herein are merely used to explain the present disclosure, and are not used to limit the present disclosure.

Figure 1:
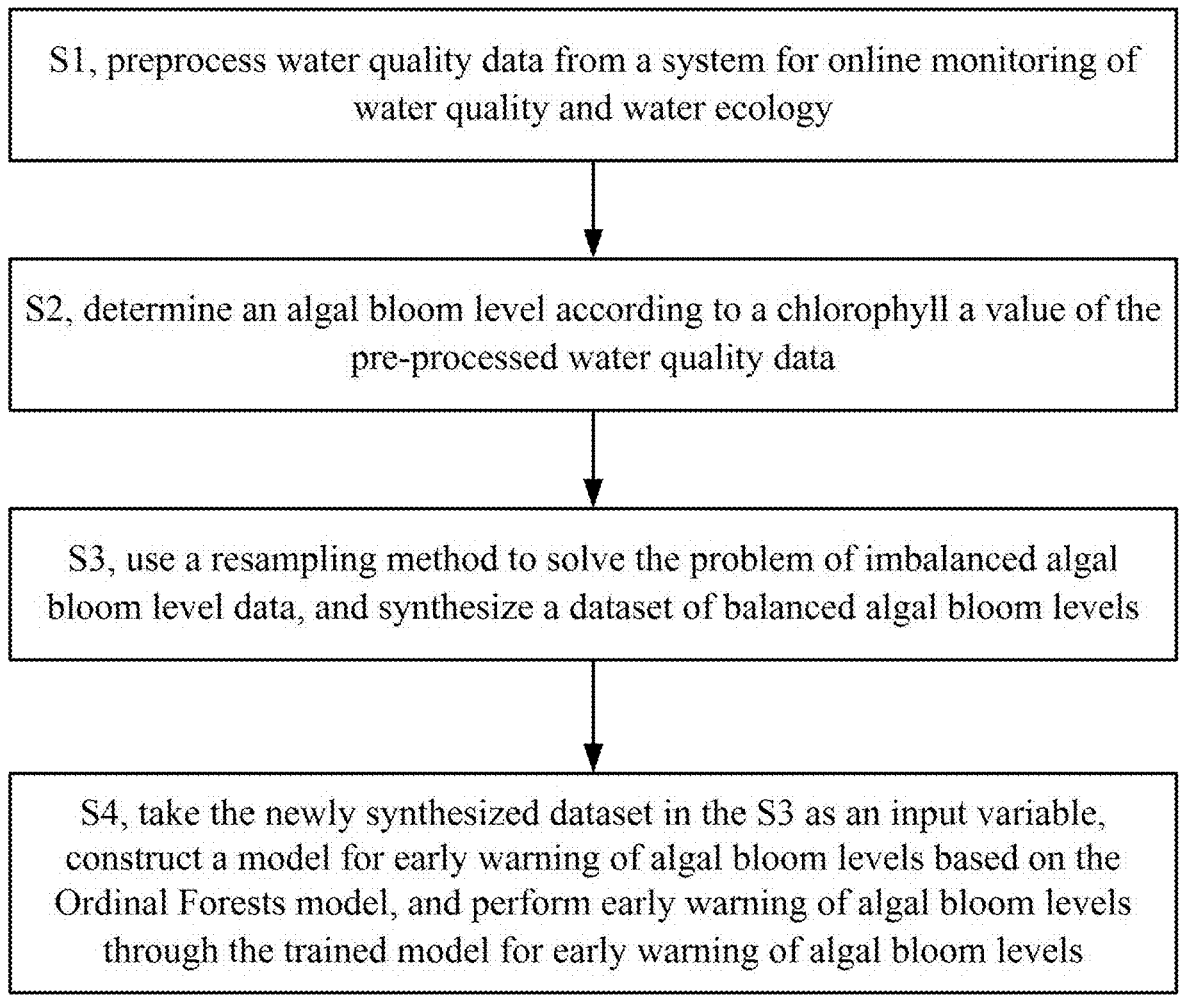
FIG. 1 is a flowchart of the present disclosure.
Figure 2:
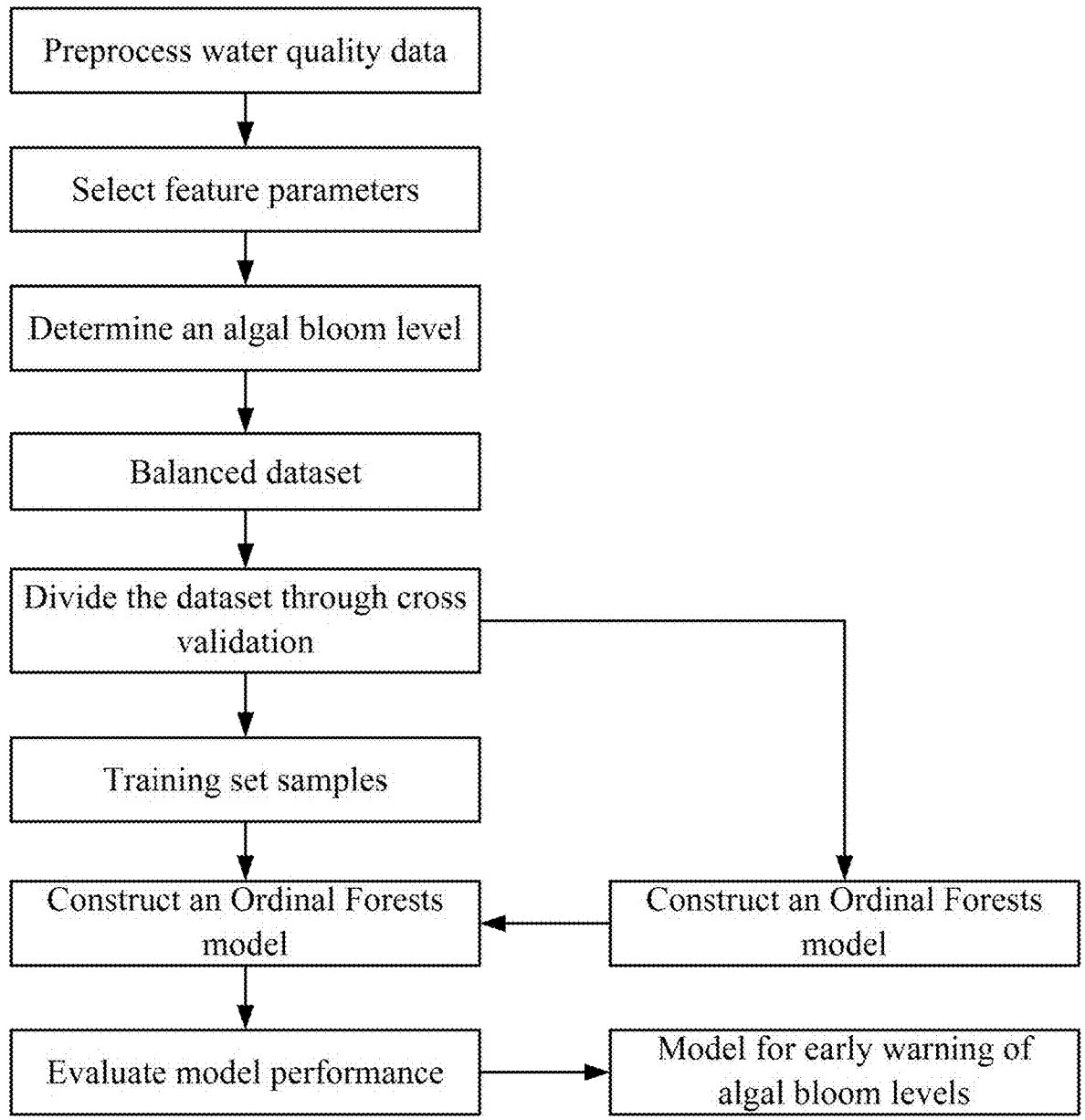
FIG. 2 is a flow block diagram of the present disclosure.

As illustrated in FIGS. 1 and 2, a method for early warning of algal bloom levels based on an Ordinal Forests model, includes the following steps:
  S1, preprocess water quality data from a system for online monitoring of water quality and water ecology;
  the water quality data in the S1 includes concentration data, pH data, water temperature data, conductivity data, turbidity data, dissolved inorganic nitrogen data and dissolved inorganic phosphorus data of chlorophyll a;
  the preprocessing water quality data in the S1 specifically includes the following steps:
  S11, perform quality control on water quality data, including deleting abnormal type data, deleting duplicate data, and resampling data;
  the deleting abnormal type data in the S11 means deleting non-numeric data, where the non-numeric data includes characters and null values; the deleting duplicate data means deleting data with duplicate timestamps; and the resampling data means unified data resampling on a daily basis by using a median method.
  S12, process missing values of water quality data, use a Kalman filtering method to fill the missing values, gradually improve an accuracy of state estimation through continuous measurement value integration and state estimation, and complete filling of the missing values;

S13, select features of water quality data through a principal component analysis method; and the S13 specifically includes the following steps:

S131, centralize and standardize processing of raw water quality data such that each feature has a mean of 0 and a variance of 1;

S132, calculate a covariance matrix of the standardized data, and then perform eigenvalue decomposition on the covariance matrix to obtain eigenvalues and corresponding eigenvectors; and S133, select the number of principal components to be retained according to the eigenvalues, and select features required for modeling.

S14, standardize the water quality data, with a calculation formula as follows:

$$y_i = \frac{x_i - \bar{x}}{\sigma}$$

where $y_i$ is standardized data; $x_i$ is measured data; $\bar{x}$ is a mean of a dataset; and $\sigma$ is a standard deviation of the dataset;

S2, determine an algal bloom level according to a chlorophyll a value of the pre-processed water quality data;

the determining an algal bloom level in the S2 specifically includes the following steps:

S21, observing relations between chlorophyll a concentration changes and various physical indicators according to data of field observations of a reservoir in water transparency changes, where the physical indicators include water body colors and transparency; and S22, with reference to relevant standards, divide algal bloom risks into five levels according to a total chlorophyll a concentration:

Level I: chlorophyll a value≤10 μg/L, indicating no algal bloom and good water quality;

Level II: 10 μg/L<chlorophyll a value≤15 μg/L, early warning, indicating a potential risk of algal bloom;

Level III: 15 μg/L<chlorophyll a value≤50 μg/L, indicating mild algal bloom, and an obvious algal bloom event in the water body;

Level IV: 50 μg/L<chlorophyll a value≤100 μg/L, indicating severe algal bloom, and an algal bloom event posing a serious threat to the ecosystem; and Level V: chlorophyll a value>100 μg/L, indicating an algal bloom disaster easily causing extremely serious ecological, social and economic impacts.

S3, use a resampling method to solve the problem of imbalanced algal bloom level data, and synthesize a dataset of balanced algal bloom levels;

the S3 specifically includes the following steps:

S31, count a total number of categories of each algal bloom level according to the algal bloom level data obtained after determination based on the standards in the S2, and determine a data imbalance ratio before adjustment; and S32, apply adaptive synthetic sampling of the algal bloom level data to synthesize a new dataset, and perform a data balance calculation according to differences in the number of samples of different categories of algal bloom level data, where the data balance calculation specifically includes the following steps:

S321, calculate a proportion p of majority class samples around each minority class sample;

S322, for each minority class sample, calculate the number of new samples that need to be generated β=p×α, where α is an adjustable parameter used to control the number of new samples; and S323, randomly select n samples from k majority class samples nearest to each minority class sample, and insert the samples between the minority class sample and the k samples nearest thereto to synthesize a balanced dataset of algal bloom levels;

S4, take the newly synthesized dataset in the S3 as an input variable, construct a model for early warning of algal bloom levels based on the Ordinal Forests model, and perform early warning of algal bloom levels through the trained model for early warning of algal bloom levels;

the S4 specifically includes the following steps:

S41, divide the newly synthesized dataset in the S3 through a 5-fold cross-validation method, i.e., dividing the newly synthesized dataset into five folds, select a fold of the dataset as a test set, with other folds of the dataset as training sets in each round, and repeat five rounds; and S42, train the Ordinal Forests model using data of the training sets when hyperparameters are given. The Ordinal Forests model is a machine learning model used to solve the problem that response variables are ordinal data, which assumes that a continuous latent variable y* is used to replace a categorical value y, and optimizes the y* value by maximizing out-of-bag (OOB) estimation performance. In a model training stage, algal bloom level data and water quality data of a previous day are used as input variables of the model, and algal bloom level data of a current day is used as an output variable of the model to construct the model for early warning of algal bloom levels based on the Ordinal Forests model;

S43, input test set data into the model for early warning of algal bloom levels, evaluate performance of the trained model for early warning of algal bloom levels in accuracy and consistency, and adjust hyperparameters of the model for early warning of algal bloom levels; and S44, apply the trained model for early warning of algal bloom levels to a water quality monitoring site, take same steps to preprocess water quality data and determine algal bloom levels every day, and input the algal bloom level data and water quality data of the previous day as input variables into the model for early warning of algal bloom levels, to obtain a local daily algal bloom level forecast.

The foregoing descriptions are merely preferred specific embodiments of the present disclosure, and are not intended to limit the protection scope of the present disclosure. Any equivalent substitutions or changes made by a person skilled in the art easily within the technical scope disclosed in the present disclosure shall fall within the protection scope of the present disclosure. Therefore, the protection scope of the present disclosure should be subject to the protection scope of the claims.

What is claimed is:

1. A method for an early warning of algal bloom levels based on an Ordinal Forests model, comprising the following steps:

S1, preprocessing water quality data from a system for online monitoring of water quality and water ecology;
wherein the preprocessing the water quality data in the S1 comprises the following steps:
- S11, performing quality control on the water quality data, comprising deleting abnormal type data, deleting duplicate data, and resampling data;
- S12, processing missing values of the water quality data, using a Kalman filtering method to fill the missing values, gradually improving an accuracy of state estimation through continuous measurement value integration and state estimation, and completing filling of the missing values;
- S13, selecting features of the water quality data through a principal component analysis method; and
- S14, standardizing the water quality data, with a calculation formula as follows:

$$y_i = \frac{x_i - \bar{x}}{\sigma},$$

wherein in the calculation formula, $y_i$ is standardized data; $x_i$ is measured data; $\bar{x}$ is a mean of a dataset; and $\sigma$ is a standard deviation of the dataset;

S2, determining an algal bloom level according to a chlorophyll a value of pre-processed water quality data;
S3, using a resampling method to solve a problem of imbalanced algal bloom level data, and synthesizing a dataset of balanced algal bloom levels; and
S4, taking a newly synthesized dataset from the S3 as an input variable, constructing a model for the early warning of algal bloom levels based on the Ordinal Forests model, and performing the early warning of algal bloom levels through a trained model for the early warning of algal bloom levels;
wherein the S4 comprises the following steps:
- S41, dividing the newly synthesized dataset from the S3 through a 5-fold cross-validation method, i.e., dividing the newly synthesized dataset into five folds, selecting a fold of the newly synthesized dataset as a test set, with other folds of the newly synthesized dataset as training sets in each round, and repeating five rounds; and
- S42, training the Ordinal Forests model using data of the training sets with given hyperparameters, using algal bloom level data and water quality data of a previous day as input variables of the Ordinal Forests model, and using algal bloom level data of a current day as an output variable of the Ordinal Forests model to construct the model for the early warning of algal bloom levels based on the Ordinal Forests model;
- S43, inputting test set data into the model for the early warning of algal bloom levels, evaluating a performance of the trained model for the early warning of algal bloom levels in accuracy and consistency, and adjusting hyperparameters of the model for the early warning of algal bloom levels; and
- S44, applying the trained model for the early warning of algal bloom levels to a water quality monitoring site, repeating steps S1, S2, and S3 to preprocess water quality data and determine algal bloom levels every day, and inputting the algal bloom level data and the water quality data of each day as input variables into the model for the early warning of algal bloom levels, to obtain a local daily algal bloom level forecast.

2. The method for the early warning of algal bloom levels based on the Ordinal Forests model according to claim 1, wherein the water quality data in the S1 comprises concentration data, pH data, water temperature data, conductivity data, turbidity data, dissolved inorganic nitrogen data, and dissolved inorganic phosphorus data of chlorophyll a.

3. The method for the early warning of algal bloom levels based on the Ordinal Forests model according to claim 1, wherein the deleting the abnormal type data in the S11 means deleting non-numeric data, wherein the non-numeric data comprises characters and null values; the deleting duplicate data means deleting data with duplicate timestamps; and the resampling data means unified data resampling on a daily basis by using a median method.

4. The method for the early warning of algal bloom levels based on the Ordinal Forests model according to claim 3, wherein the S13 comprises the following steps:
- S131, centralizing and standardizing processing of raw water quality data such that each feature has a mean of 0 and a variance of 1;
- S132, calculating a covariance matrix of standardized data, and then performing eigenvalue decomposition on the covariance matrix to obtain eigenvalues and corresponding eigenvectors; and
- S133, selecting a number of principal components to be retained according to the eigenvalues, and selecting features required for modeling.

5. The method for the early warning of algal bloom levels based on the Ordinal Forests model according to claim 1, wherein the determining the algal bloom level in the S2 comprises the following steps:
- S21, observing relations between chlorophyll a concentration changes and various physical indicators according to data of field observations of water transparency changes in a reservoir, wherein the physical indicators comprise water body colors and transparency; and
- S22, with reference to relevant standards, dividing algal bloom risks into five levels according to a total chlorophyll a concentration:
  - level I: chlorophyll a value≤10 µg/L, indicating no algal bloom and good water quality;
  - level II: 10 µg/L<chlorophyll a value≤15 µg/L, early warning, indicating a potential risk of algal bloom;
  - level III: 15 µg/L<chlorophyll a value≤50 µg/L, indicating mild algal bloom, and an obvious algal bloom event in a water body;
  - level IV: 50 µg/L<chlorophyll a value≤100 µg/L, indicating severe algal bloom, and an algal bloom event posing a serious threat to an ecosystem; and
  - level V: chlorophyll a value >100 µg/L, indicating an algal bloom disaster easily causing extremely serious ecological, social, and economic impacts.

6. The method for the early warning of algal bloom levels based on the Ordinal Forests model according to claim 1, wherein the S3 comprises the following steps:
- S31, counting a total number of categories of each algal bloom level according to algal bloom level data obtained after determination based on standards in the S2, and determining a data imbalance ratio before adjustment; and
- S32, applying adaptive synthetic sampling of the algal bloom level data to synthesize a new dataset, and performing a data balance calculation according to differences in a number of samples of different categories of the algal bloom level data, wherein the data balance calculation comprises the following steps:

S321, calculating a proportion p of majority class samples around each minority class sample;

S322, for each minority class sample, calculating a number of new samples that need to be generated $\beta=p\times\alpha$, wherein $\alpha$ is an adjustable parameter used to control the number of new samples; and S323, randomly selecting n samples from k majority class samples nearest to each minority class sample, and inserting the n samples between the minority class sample and the k majority class samples nearest thereto to synthesize a balanced dataset of algal bloom levels.

* * * * *